(12) United States Patent
Ha et al.

(10) Patent No.: US 7,348,091 B2
(45) Date of Patent: Mar. 25, 2008

(54) FUEL CELL HAVING FLOW PASSAGE

(75) Inventors: Sam Chul Ha, Changwon-si (KR); Tae Hee Cho, Changwon-si (KR); Myung Seok Park, Jinhae-si (KR); Hong Choi, Changwon-si (KR); Cheol Hwan Kim, Gimhae-si (KR); Myeong Ho Lee, Busan-si (KR); Seoug Geum Heo, Busan-si (KR); Seung Tae Ko, Daegu-si (KR)

(73) Assignee: LG Electronics Inc., Seoul (KR)

( * ) Notice: Subject to any disclaimer, the term of this patent is extended or adjusted under 35 U.S.C. 154(b) by 568 days.

(21) Appl. No.: 10/499,703

(22) PCT Filed: Dec. 10, 2003

(86) PCT No.: PCT/KR03/02705

§ 371 (c)(1),
(2), (4) Date: Jun. 21, 2004

(87) PCT Pub. No.: WO2004/054027

PCT Pub. Date: Jun. 24, 2004

(65) Prior Publication Data

US 2005/0130020 A1 Jun. 16, 2005

(30) Foreign Application Priority Data

Dec. 10, 2002 (KR) ............. 10-2002-0078472

(51) Int. Cl.
*H01M 2/02* (2006.01)
(52) U.S. Cl. ............................. 429/34; 429/38; 429/39
(58) Field of Classification Search ............... 429/34, 429/38, 39, 44, 30, 32
See application file for complete search history.

(56) References Cited

U.S. PATENT DOCUMENTS

| 5,871,860 | A * | 2/1999 | Frost et al. ............... 429/40 |
| 6,183,898 | B1* | 2/2001 | Koschany et al. ........... 429/42 |
| 2001/0036567 | A1 | 11/2001 | Gyoten et al. |
| 2002/0045084 | A1 | 4/2002 | Fujii et al. |
| 2002/0055031 | A1 | 5/2002 | Fujii et al. |

FOREIGN PATENT DOCUMENTS

| EP | 1059686 A2 | 12/2000 |
| KR | 2002-0084159 A | 11/2002 |

\* cited by examiner

*Primary Examiner*—Raymond Alejandro
(74) *Attorney, Agent, or Firm*—Birch, Stewart, Kolasch & Birch, LLP

(57) ABSTRACT

Fuel cell including an electrolyte, an anode and a cathode on both sides of the electrolyte, a cathode side separator at an outer side of the cathode having a flow passage for flow of air, and a flow passage between the electrolyte and the anode, thereby improving an electricity generating performance.

17 Claims, 11 Drawing Sheets

FUEL CELL HAVING FLOW PASSAGE

TECHNICAL FIELD

The present invention relates to fuel cells, and more particularly, to a fuel cell which can improve electricity generating performance.

BACKGROUND ART

The fuel cell transforms a chemical energy of a fuel into an electric energy by means of a chemical reaction, directly. Different from a related art battery, the fuel cell can generate electricity continuously without recharge as far as the fuel is supplied. Owing to the high energy efficiency, and the environment friendly nature, interest is focused thereto, recently.

In general, the fuel cell has two electrodes, i.e., an anode and a cathode arranged on both sides of an electrolyte. There are an anode side separator at an outer side of the anode having a fuel passage for supporting the anode, and a cathode separator at an outer side of the cathode having an air passage for supporting the cathode. Electro-chemical reaction of hydrogen takes place at the anode, and electro-chemical reduction of oxygen, an oxidizer, takes place at the cathode, when an electric energy is generated as electrons generated in this time transfer.

A variety of fuels in a hydrocarbon group (CH group), such as LNG, LPG, methanol, gasoline, and the like can be used in the fuel cell. In general, the fuel is refined into hydrogen through desulfurization, reforming reaction, and hydrogen refining process at a fuel reformer, and used in a form of a gas. Or, a fuel in a form of water solution may be used, for an example, by making solid state $BH^-_4$ into a water solution state (Boro Hydro Fuel Cell:BFC). The BFC has an advantage in that no fuel reformer is required, which enables to simplify a fuel cell system, because a fuel of a water solution state is fed to the anode, and the reforming reaction takes place at the anode, without the fuel reformer.

In the meantime, in the fuel cells, there are a phosphoric fuel cell, a molten carbonate fuel cell, an alkaline fuel cell, a solid oxide fuel cell, and a polymer membrane fuel cell depending on electrolytes.

A related art fuel cell system will be described with reference to FIG. 1.

Referring to FIG. 1, the fuel stored in a fuel tank 5 is supplied to a fuel cell 1 by a fuel pump 3, and air is supplied to the fuel cell 1 by an air pump 7. The fuel cell 1 may be a unit cell or a stack of unit cells.

An exemplary related art fuel cell will be described with reference to FIGS. 2 and 3. FIG. 2, or 3 illustrates unit cell.

There are an anode 30 and a cathode 20 arranged on opposite sides of an electrolyte 10. There are separators 40 and 50 at outer sides of the anode 30 and the cathode 20. Both the anode 30 and the cathode 20 are porous and in general contain platinum.

As described, there are an anode side separator 50 at an outer side of the anode 30, and a cathode side separator 40 at an outer side of the cathode 20. The separators 40, and 50 support the anode 30 and the cathode 20, and have flow passages 46 and 56 formed with walls 44, and 54, respectively. There may be a variety of forms of the flow passages. The separator 40 or 50 also separates adjacent unit cells in a unit cell stack. Meanwhile, there may be separate collector plates at outer sides of the separators 40 and 50, respectively.

In general, the electrolyte 10, an ion exchange membrane of a polymer, such as NAFION® from DuPont™, transmits hydrogen ions, and prevents contact of oxygen and hydrogen. In general, the anode 30 and the cathode 20, supporters having catalyst attached thereto, are porous carbon paper, or carbon cloth. In general, the separators 40 and 50 are close textured carbon plates.

The operation of the fuel cell will be described.

The fuel and air supplied to the fuel cell flow through the anode 30 and the cathode 20 respectively, and make the following reactions.

Anode: $BH_4 + 8OH \rightarrow BO_2 + 6H_2O + 8e$  $E_0 = -1.24V$
Cathode: $2O_2 + 4H_2O + 8e \rightarrow 8OH$  $E_0 = 0.4V$
Total: $BH_4 + 2O_2 \rightarrow 2H_2O + BO_2$  $E_0 = 1.62V$ In the meantime, for stabilizing a $BH_4$ solution, a certain amount of Na is added, to cause a side reaction at the anode 30 to generate hydrogen gas. That is, a reaction of $2H_2O + NaBH_4 \rightarrow NaBO_2 + 4H_2$ takes place at the anode 30.

The related art fuel cell has the following problem.

The hydrogen gas generated by the side reaction at the anode is attached in forms of bubbles between the anode and the electrolyte to impede reaction between the fuel and the air, to result in a poor electricity generation performance.

In the meantime, the problem is caused in fuel cells other than the BFC, too. Because in general the side reaction takes place in cases hydrogen is not supplied to the anode directly as a fuel, resulting to have a substance produced in the side reaction attached between the electrolyte and the anode, to impede the chemical reaction. The substance produced in the side reaction may be, for an example, carbon dioxide other than the hydrogen gas depending on the fuel.

DISCLOSURE OF INVENTION

An object of the present invention, provided to solve the foregoing problem, is to provide a fuel cell which can improves an electricity generating performance.

The object of the present invention can be achieved by providing a fuel cell including an electrolyte, an anode and a cathode on both sides of the electrolyte, a cathode side separator at an outer side of the cathode having a flow passage for flow of air, and a flow passage between the electrolyte and the anode.

The anode is spaced a distance away from the electrolyte, to form the flow passage. Preferably, the flow passage has a separating member arranged therein for supporting the anode.

Preferably, the fuel cell further includes a flow passage forming member having the flow passage formed therein between the anode and the electrolyte. The flow passage forming member includes a plurality of walls for forming the flow passage. The flow passage forming member includes a mesh formed part that forms the flow passage. The flow passage also serves as a flow passage for a fuel.

In a case of a stacked form of fuel cell, the anode is supported on an adjoining cathode side separator.

Preferably, the fuel cell further includes an anode side separator at an outer side of the anode, having a fuel flow passage for flow of the fuel.

In the meantime, it is preferable that the fuel cell further includes a supporting member between the cathode and the cathode side separator, and more preferably, the supporting member has a mesh form.

In other aspect of the present invention, there is provided a fuel cell including an electrolyte, an anode and a cathode on both sides of the electrolyte, an anode side separator at an outer side of the anode, a cathode side separator at an outer side of the cathode, and a supporting member between the cathode and the cathode side separator, having through holes for pass of air.

In another aspect of the present invention, there is provided a fuel cell including an electrolyte, an anode and a cathode on both sides of the electrolyte, an anode side separator at an outer side of the anode, a cathode side separator at an outer side of the cathode, and a supporting member between the anode and the anode side separator, having through holes for pass of fuel in a state of gas.

Thus, the present invention can improve an electricity generating performance of a fuel cell.

BRIEF DESCRIPTION OF DRAWINGS

The accompanying drawings, which are included to provide a further understanding of the invention, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. In describing the embodiments, parts the same with the related art fuel cell will be given the same names and reference symbols, and detailed description of which will be omitted.

Figure 1:
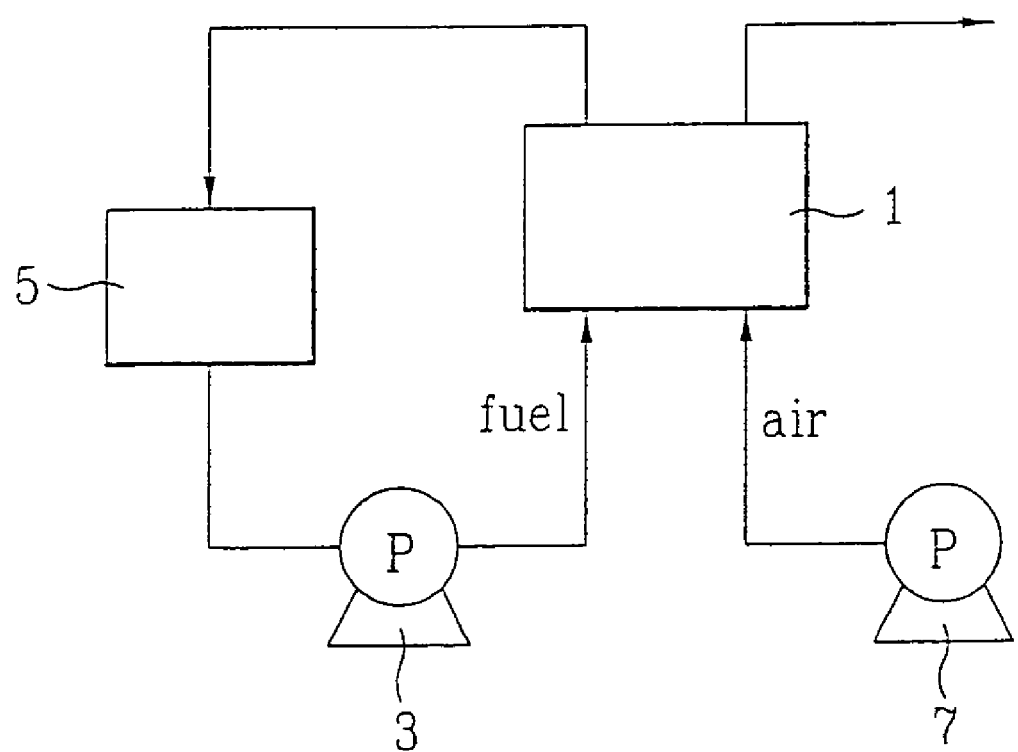
FIG. 1 illustrates a diagram of a related art fuel cell system.
Figure 2:
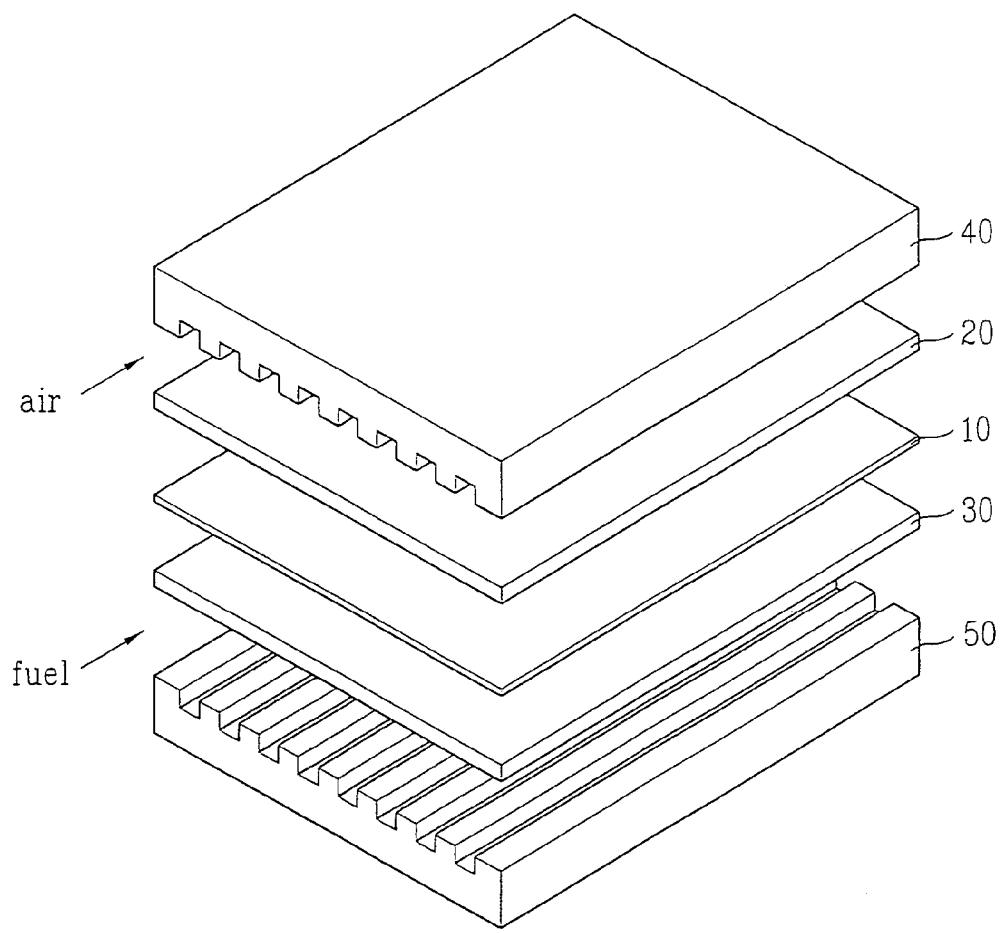
FIG. 2 illustrates a disassembled perspective view of a related art fuel cell, schematically.
Figure 3:
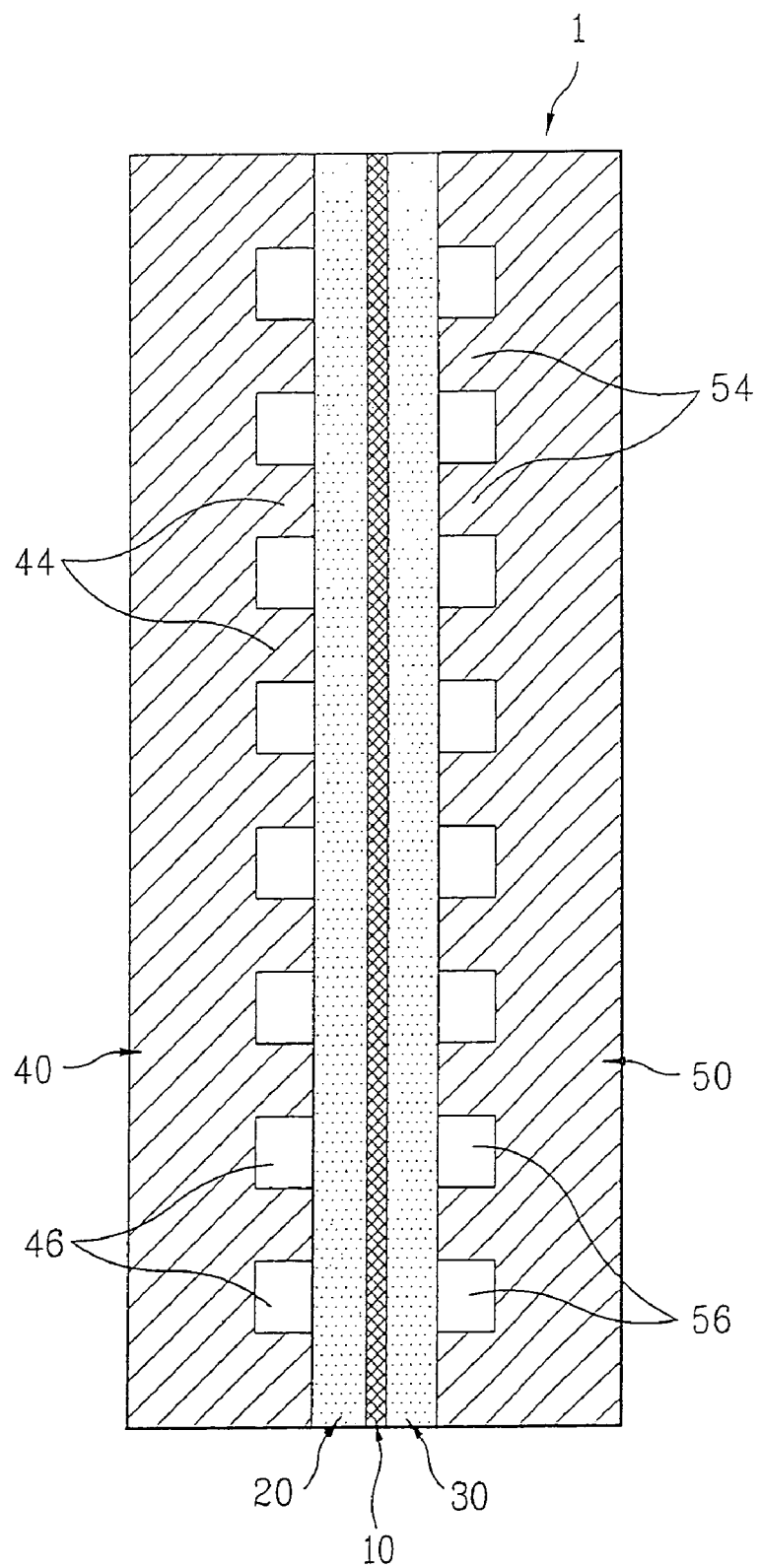
FIG. 3 illustrates a section of FIG. 2.
Figure 4:
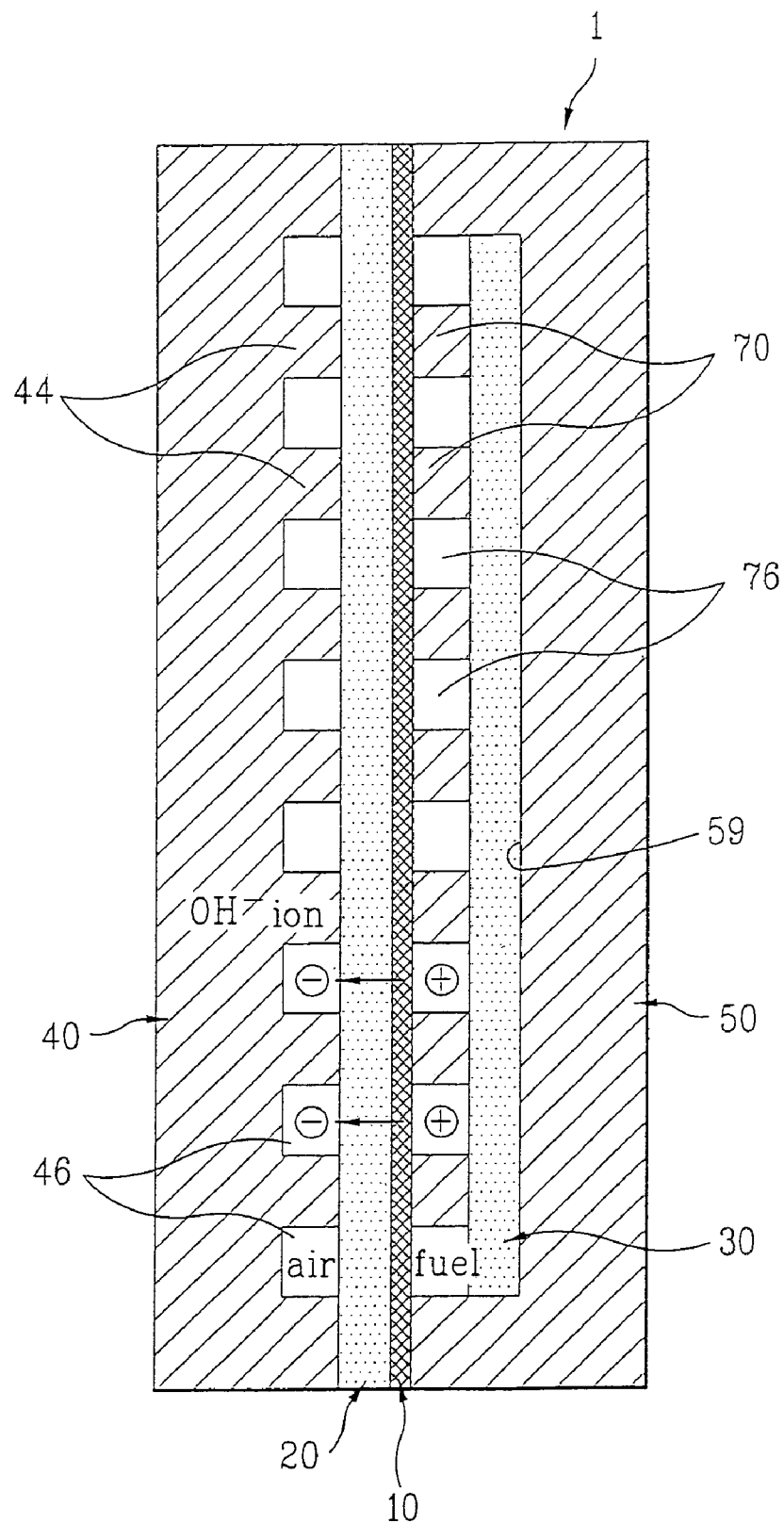
FIG. 4 illustrates a section of a fuel cell in accordance with a preferred embodiment of the present invention, schematically.

A preferred embodiment of the fuel cell of the present invention will be described with reference to FIG. 4.

Identical to the related art fuel cell, the fuel cell of the present invention also includes an electrolyte 10, an anode 30, a cathode 20, an anode side separator 50, and a cathode side separator 40. Even though one separator 40 or 50 has one side in contact with the anode 30 and the other side in contact with the cathode 20 at the same time in a stack form of fuel cell in which a plurality of unit cells are stacked, in the following description, names of an anode side separator 50 and a cathode side separator 40 will be used for convenience of description.

The present invention enables smooth discharge of a substance (hereafter called as a 'side reaction substance') produced from a side reaction at the anode 30 according to kind of fuel—for an example, hydrogen gas in the case of BFC—as described in the related art to an outside of the fuel cell without attachment to the electrolyte. That is, the present invention suggests providing flow passages between the electrolyte 10 and the anode 30, for discharging the side reaction substance to the outside of the fuel cell.

The flow passage 76 may be formed by different methods, as far as the flow passage 76 can secure a space that permits flow of the side reaction substance between the electrolyte 10 and the anode 30. For an example, as shown in FIG. 4, if the anode 30 and the electrolyte 10 are arranged simply spaced a distance away from each other, there is a gap between the anode 30 and the electrolyte 10, which serves as the flow passage. Though FIG. 4 illustrates the anode 30 simply seated on a surface 59 of the anode side separator 50, the present invention is not limited to this.

In general, the anode 30 is formed of a soft material. Therefore, once the anode 30 is spaced a distance away from the electrolyte 10 in the space, it is preferable that a plurality of separating members 70 are arranged. In this case, spaces formed between the separating members 70 become the flow passages 76.

The operation of the embodiment will be described.

Once the fuel cell is put into operation, air is supplied to the flow passage 46 formed in the cathode side separator 40, and $BH_4$ water solution is supplied to the flow passage 76 formed in a space between the anode 30 and the electrolyte 10. The supplied $BH_4$ water solution and the air flow along the flow passages 46 and 76 on opposite sides of the electrolyte 10, such that the hydrogen spreads on an entire surface of the anode 30, and causes electro-chemical oxidation, and the oxygen spreads on an entire surface of the cathode 20, and causes electrochemical reduction, when electricity is generated owing to migration of electrons produced in the reaction.

Figure 5:
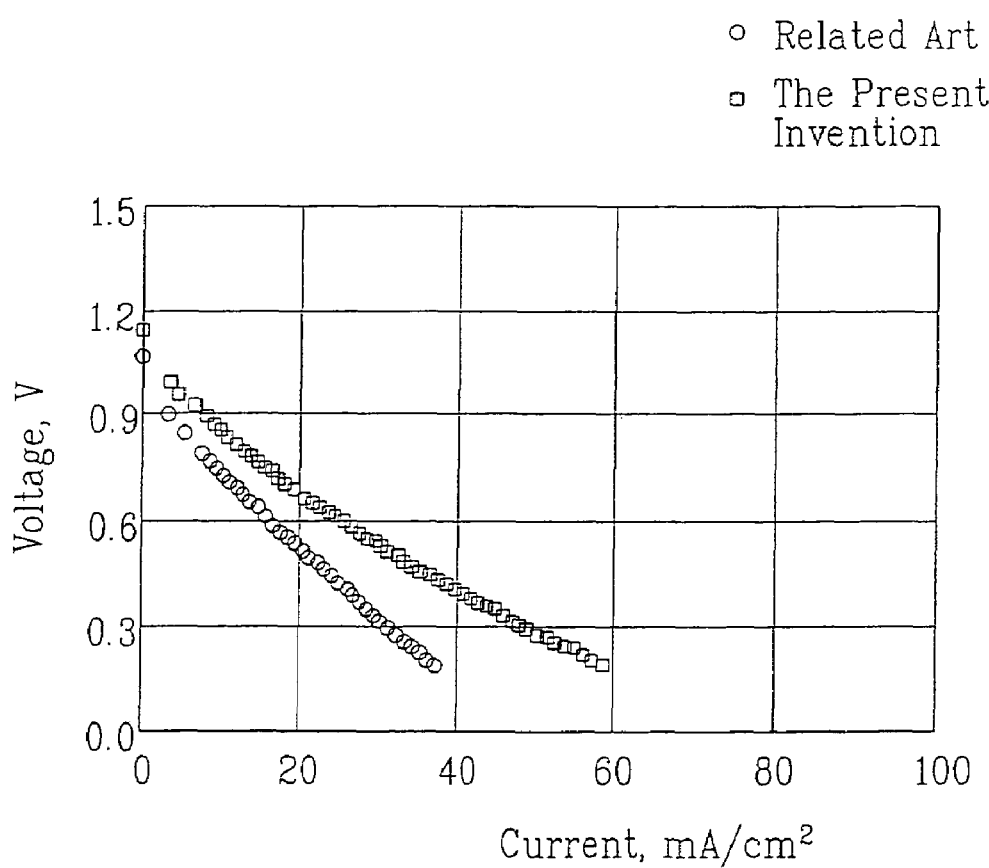
FIG. 5 illustrates a comparative graph of performances of the fuel cell of the present invention and the fuel cell of the related art.

In the meantime, hydrogen gas is produced by the side reaction taken place at the anode 30. The hydrogen gas is discharged to an outside of the fuel cell together with the $BH_4$ water solution through the flow passages 76 between the electrolyte 10 and the anode 30. According to this, the embodiment can prevent attachment of the hydrogen gas to the electrolyte 10, to make the chemical reaction active, with consequential improvement of the electricity generating performance. FIG. 5 illustrates a comparative graph of performances of the fuel cell of the present invention and the fuel cell of the related art, wherein it can be noted that the fuel cell of the present invention has a better electricity generating performance than the related art fuel cell.

Figure 6:
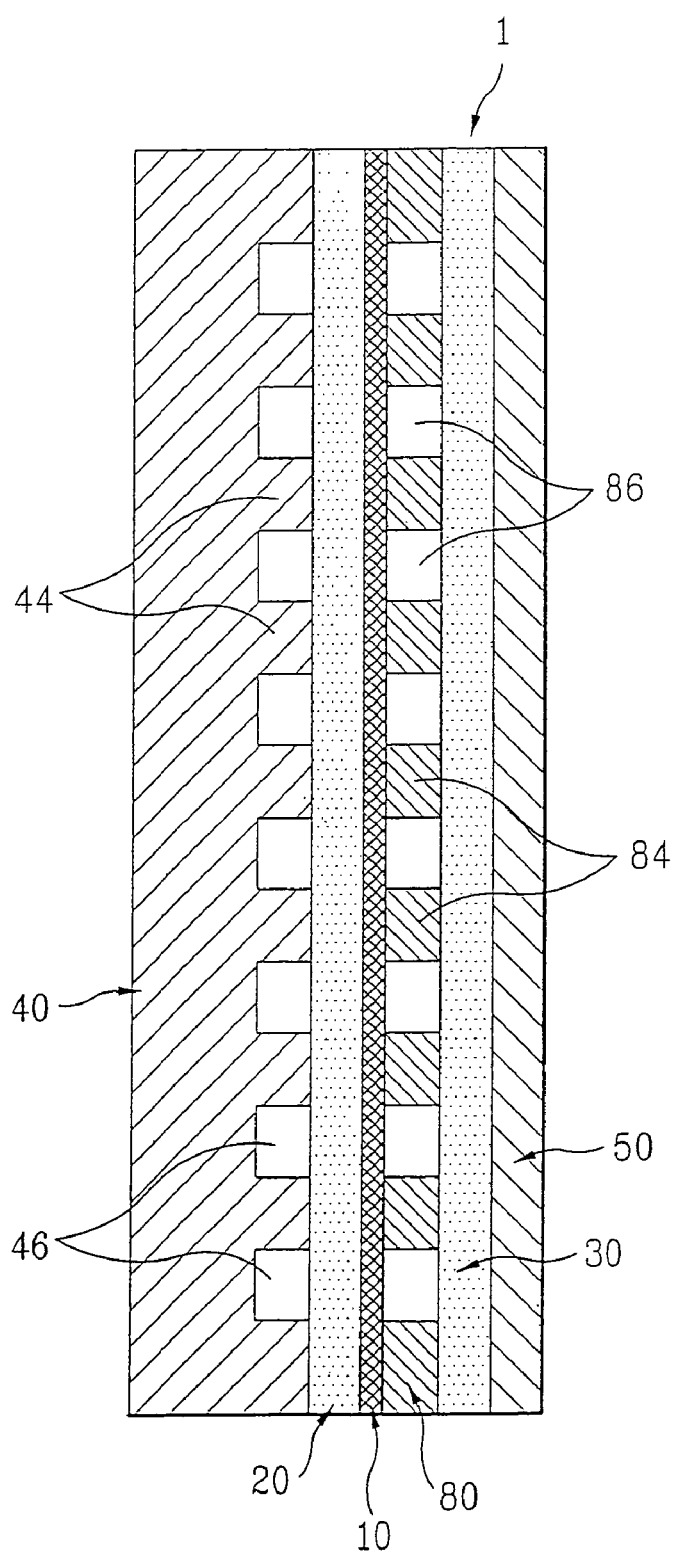
FIG. 6 illustrates a section of a fuel cell in accordance with other preferred embodiment of the present invention, schematically.

A fuel cell in accordance with other preferred embodiment of the present invention will be described with reference to FIG. 6.

The principle of the embodiment is the same with above embodiment, except that the embodiment takes a convenience of fabrication into account more than above embodiment. That is, though above embodiment provides a plurality of separating members 70 between the electrolyte 10 and the anode 30, the embodiment suggests to unify the separating members 70. That is, the embodiment suggests arranging a flow passage forming member 80 between the electrolyte 10 and the anode 30. This structure enables to achieve the object of the present invention only by simply providing the flow passage forming member 80 between the electrolyte 10 and the anode 30.

Figure 7:
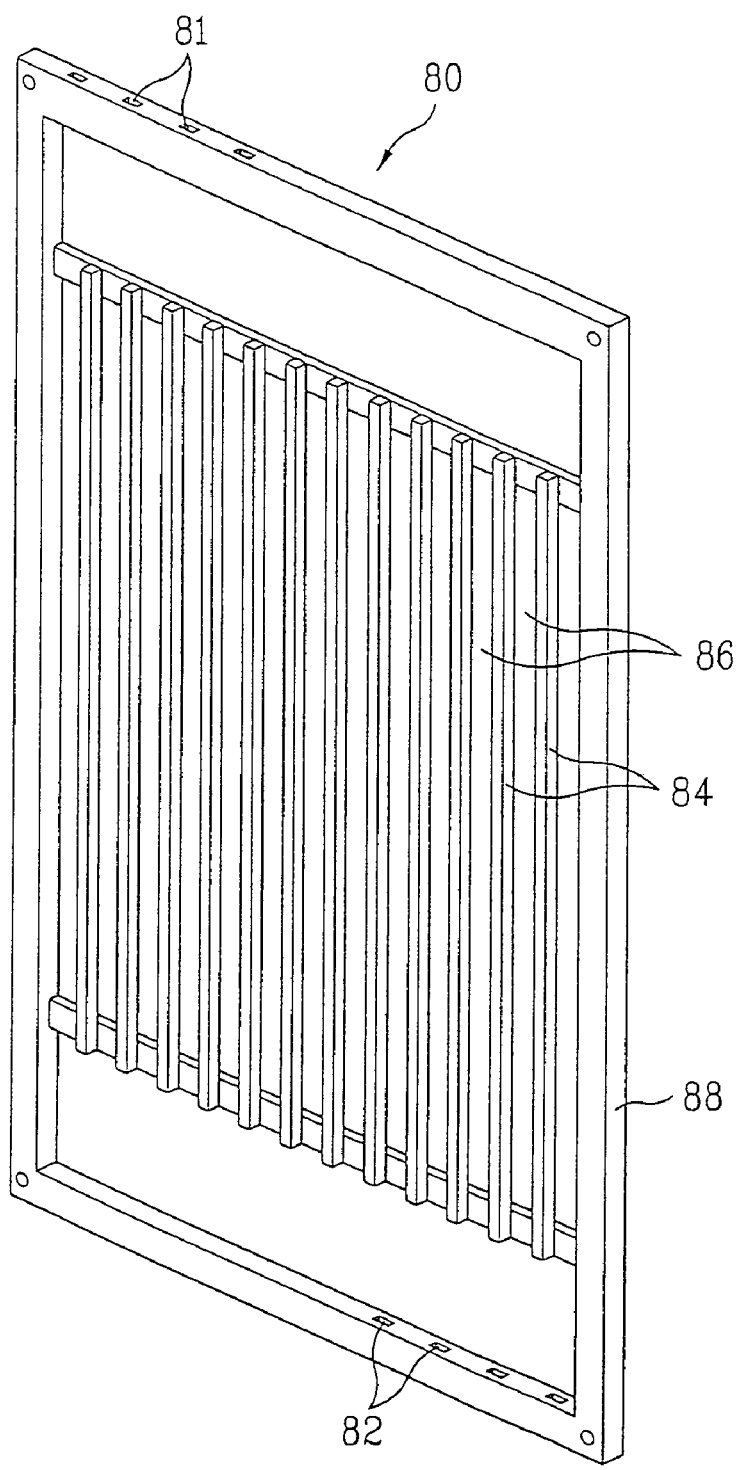
FIG. 7 illustrates a perspective view of the flow passage forming member in FIG. 6.

The flow passage forming member 80 may have a variety of forms as far as the flow passage forming member 80 has the flow passages 86. For an example, as shown in FIG. 7, it is required only to form the flow passages 86, fuel inlets 81, and fuel outlets 82 in a body 88 of a rectangular frame. The flow passage 86 may have different forms. FIG. 7 illustrates the flow passages 86 made of linear walls 84, between which the flow passages 86 are formed. Other than this, a perforated member, such as a mesh formed member may be used, when a plurality of through holes in the mesh serve as the flow passages. Particularly, in a case of corrugated anode, use of the mesh formed member is preferred. Because sagging of the electrolyte between corrugations of the corrugated anode can be prevented by the flow passage forming member.

Figure 8:
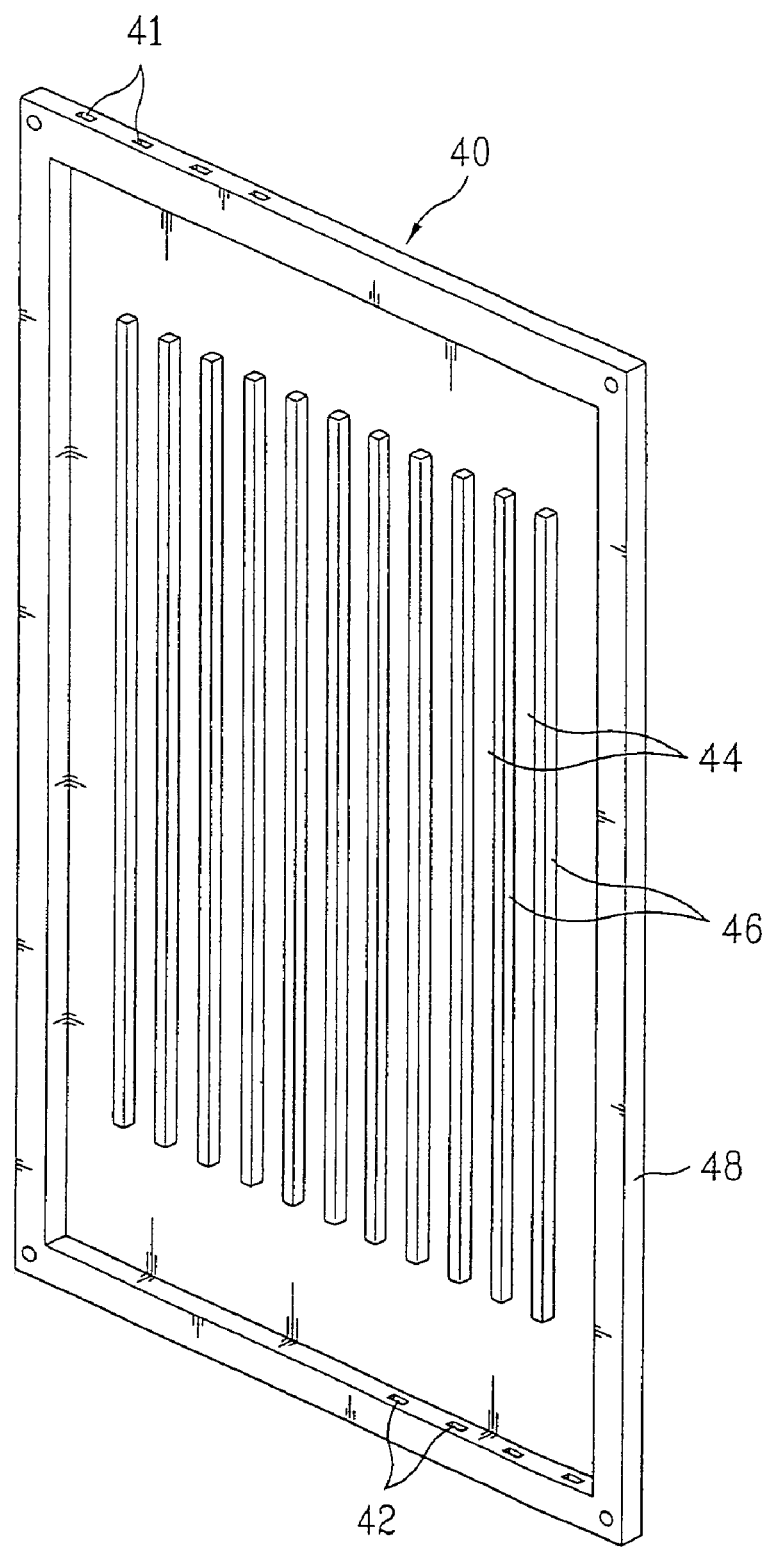
FIG. 8 illustrates a perspective view of the cathode in FIG. 6.

One example of the cathode side separator will be described with reference to FIG. 8. A body 48 of the separator 40 has air inlets 41 and air outlets 42, and flow passages 46 formed therein for increasing a contact area of oxygen and the cathode 20 as far as possible. FIG. 8 illustrates a plurality of walls 44 to form the flow passages 46.

Figure 9:
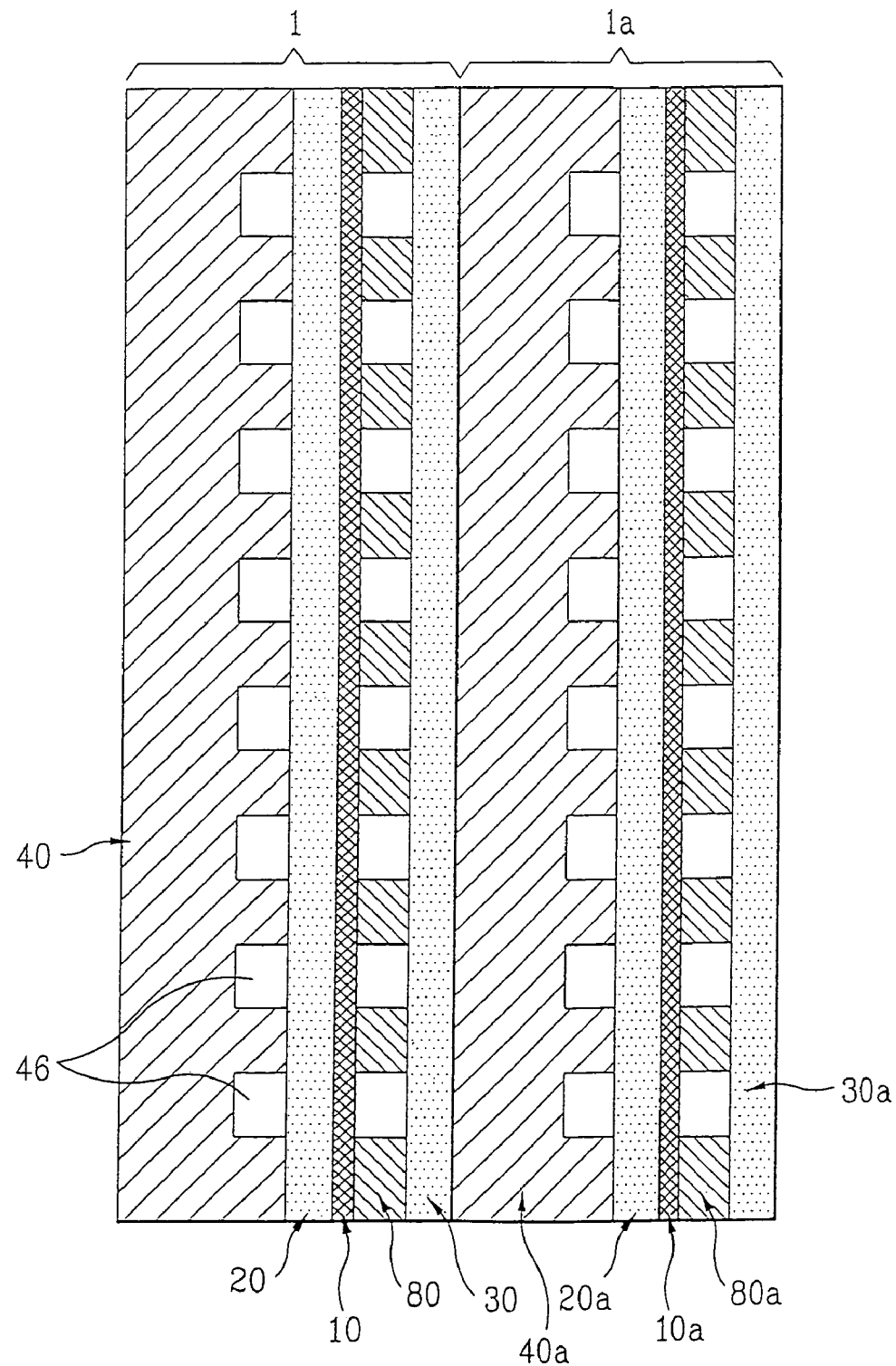
FIG. 9 illustrates a section of a stack of the fuel cells in FIG. 6.

In the meantime, in above embodiments, the anode side separator 50 mainly serves to support the anode 30. Therefore, as shown in FIG. 9, in a case a stacked fuel cell of unit cells, it is preferable that, no anode side separator 50 is used, but the anode 30 is supported on the cathode side separator 40a of the unit fuel cell 1a having the electrolyte 10a the cathode 20a, the anode 30a, the cathode side separator 40a and the flow passage forming member 80a. Of course, even in the unit fuel cell, it is possible to fix the anode 30 in an appropriate method without using the anode side separator 50.

Figure 10:
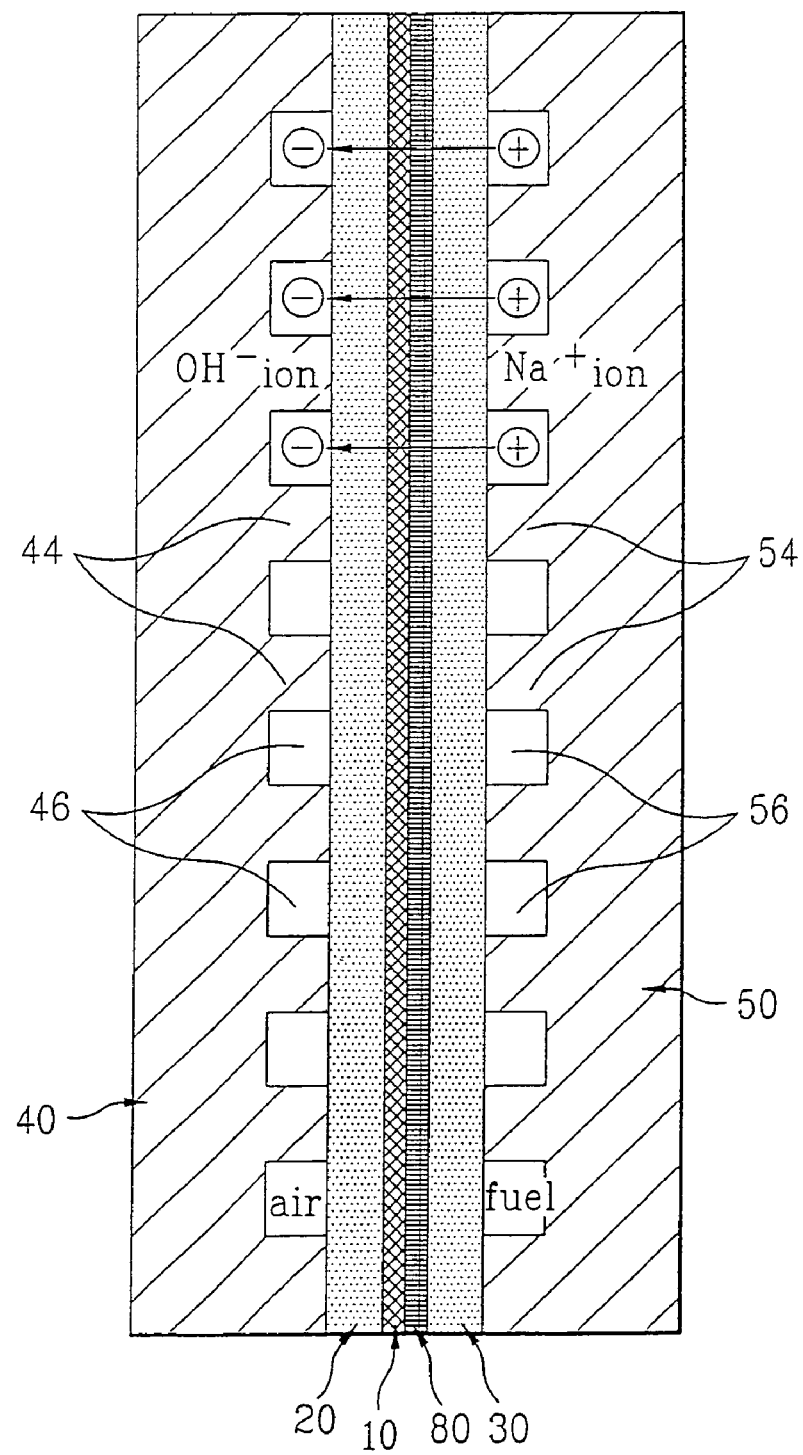
FIGS. 10 and 11 respectively illustrate sections each showing a fuel cell in accordance with another preferred embodiment of the present invention, schematically.

In the meantime, in above embodiments, the anode 30 in close contact with a surface of the anode side separator 50 is illustrated and described as one embodiment of the present invention. In this case too, the flow passages 76 and 86 between the anode 30 and the electrolyte 10 serve as a passage for discharging the side reaction substance to the outside to the fuel cell, the flow passages 76 and 86 also serve as passages for flow of fuel. Of course, the present invention is not limited to this. That is, as illustrated in FIG. 10, the anode side separator 50 may have a plurality of walls 54 formed in a predetermined method for forming the flow passages 56 for flow of the fuel. However, even though a mesh type member is illustrated in FIG. 10 as one example of the flow passage forming member 80, the flow passage forming member 80 is not limited to this, and a form of the flow passage forming member 80 similar to one in FIG. 7 may also be used.

Principles of above embodiments are not limited to the BFC, but applicable to other fuel cells each having the anode no hydrogen is supplied thereto directly.

Figure 11:
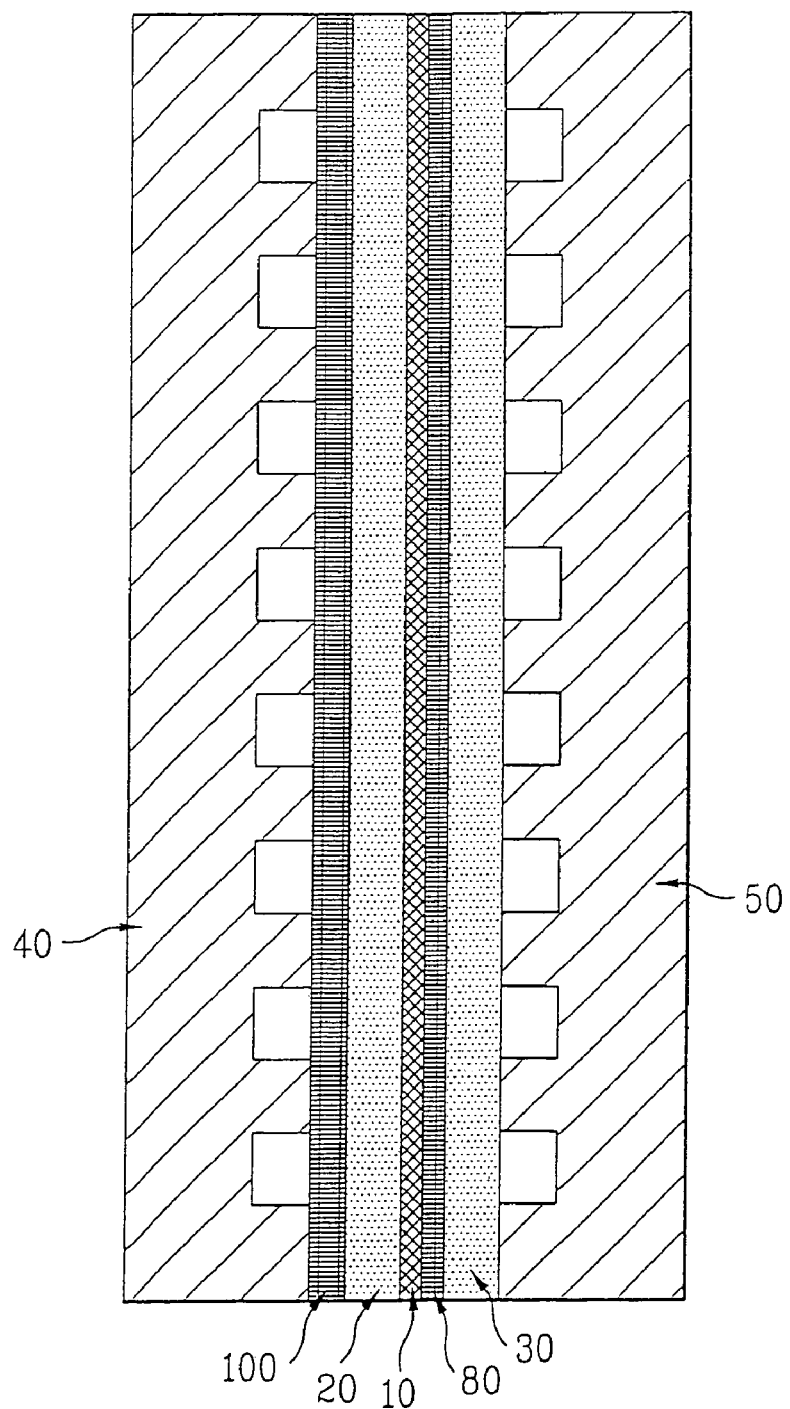

A fuel cell in accordance with another preferred embodiment of the present invention will be described, with reference to FIG. 11.

In the embodiment, there is a supporting member 100 arranged between a cathode 20 and a cathode side separator 40, which will be described in detail.

Different from the anode 30, the cathode 20 has air, in a state of gas, supplied thereto. Therefore, it is effective that the cathode 20 is in close, and uniform contact with the cathode side separator 40 throughout an entire surface of the cathode 20 with a small gap. Accordingly, it is preferable the supporting member 100 is arranged between the cathode 20 and the cathode side separator 40. The supporting member 100 permits uniform, and close contact of the cathode 20 with the cathode side separator 40, that makes ion transmission effective. Of course, any material that has through holes for pass of air, and an appropriate strength may be used as the supporting member 100. Therefore, a mesh formed member is preferable as the supporting member 100.

It is more preferable to use the flow forming member 80 between the electrolyte 10 and the anode 30 alike above embodiments.

The principle of the embodiment may be applied to the anode. That is, in a case of a fuel cell having an anode a gaseous fuel supplied thereto, if the supporting member is arranged between the anode and the anode side separator, the same effect can be obtained.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The effective discharge of the side reaction substance produced at an anode by a side reaction to an outside of the fuel cell permits a smooth chemical reaction at the anode, to improve an electricity generation performance. Moreover, the smooth ion transmission to the cathode improves the electricity generation performance.

What is claimed is:

1. A fuel cell comprising:
  an electrolyte;
  an anode and a cathode on both sides of the electrolyte;
  a cathode side separator at an outer side of the cathode having a flow passage for flow of air; and
  a fuel flow passage for supplying fuel to the anode, the fuel flow passage being located between the electrolyte and the anode and spacing the anode apart from the electrolyte.

2. The fuel cell as claimed in claim 1, wherein the anode is spaced apart from the electrolyte by a plurality of separating members.

3. The fuel cell as claimed in claim 2, wherein the fuel flow passage is between any two immediately adjacent separating members.

4. The fuel cell as claimed in claim 1, further comprising a flow passage forming member having the fuel flow passage formed therein between the anode and the electrolyte.

5. The fuel cell as claimed in claim 4, wherein the flow passage forming member includes a plurality of walls for forming the fuel flow passage.

6. The fuel cell as claimed in claim 4, wherein the flow passage forming member includes a mesh formed part that forms the fuel flow passage.

7. The fuel cell as claimed in one of claims 1 to 6, wherein the fuel flow passage also serves as a flow passage for a reaction gas generated at the anode.

8. The fuel cell as claimed in claim 1, wherein the anode is supported on an adjoining cathode side separator.

9. The fuel cell as claimed in claim 1, further comprising an anode side separator at an outer side of the anode, having a second fuel flow passage for flow of the fuel.

10. The fuel cell as claimed in claim 1, further comprising a supporting member between the cathode and the cathode side separator.

11. The fuel cell as claimed in claim 10, wherein the supporting member has a mesh form.

12. A fuel cell comprising:
  an electrolyte;
  an anode and a cathode on both sides of the electrolyte;

an anode side separator at an outer side of the anode;

a cathode side separator at an outer side of the cathode;

a fuel flow passage for supplying the fuel to the anode, the fuel flow passage being located between the electrolyte and the anode and spacing the anode apart from the electrolyte; and a supporting member between the cathode and the cathode side separator, having through holes for pass of air.

13. The fuel cell as claimed in claim 12, wherein the supporting member has a mesh form.

14. The fuel cell as claimed in claim 12, wherein the anode is spaced apart from the electrolyte by a plurality of separating members.

15. The fuel cell as claimed in claim 14, wherein the fuel flow passage is between any two immediately adjacent separating members.

16. A fuel cell comprising:

an electrolyte;

an anode and a cathode on both sides of the electrolyte;

an anode side separator at an outer side of the anode;

a cathode side separator at an outer side of the cathode;

a fuel flow passage for supplying the fuel to the anode, the fuel flow passage being located between the electrolyte and the anode and spacing the anode apart from the electrolyte; and a supporting member between the anode and the anode side separator, having through holes for pass of fuel in a state of gas.

17. The fuel cell as claimed in claim 16, wherein the supporting member has a mesh form.

* * * * *